(12) United States Patent
Furuhata et al.

(10) Patent No.: US 10,427,259 B2
(45) Date of Patent: Oct. 1, 2019

(54) TILT DEVICE FOR MACHINE TOOL

(71) Applicant: JTEKT CORPORATION, Osaka-shi (JP)

(72) Inventors: Tetsuro Furuhata, Nagoya (JP); Keisuke Usuda, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 13 days.

(21) Appl. No.: 15/452,367

(22) Filed: Mar. 7, 2017

(65) Prior Publication Data
US 2017/0259387 A1 Sep. 14, 2017

(30) Foreign Application Priority Data
Mar. 9, 2016 (JP) ................. 2016-046157

(51) Int. Cl.
| | | |
|---|---|---|
| *B23Q 5/56* | (2006.01) | |
| *B23Q 16/02* | (2006.01) | |
| *F16M 11/06* | (2006.01) | |
| *F16M 11/18* | (2006.01) | |
| *B23Q 1/54* | (2006.01) | |
| *B23Q 5/08* | (2006.01) | |
| *B23Q 11/00* | (2006.01) | |

(52) U.S. Cl.
CPC ............. *B23Q 5/56* (2013.01); *B23Q 1/5406* (2013.01); *B23Q 5/08* (2013.01); *B23Q 11/001* (2013.01); *B23Q 16/022* (2013.01); *B23Q 16/026* (2013.01); *F16M 11/06* (2013.01); *F16M 11/18* (2013.01)

(58) Field of Classification Search
CPC ........ B23Q 5/56; B23Q 16/022; F16M 11/18; F16M 11/06

USPC ......................................................... 248/550
See application file for complete search history.

(56) References Cited

U.S. PATENT DOCUMENTS

| | | | | |
|---|---|---|---|---|
| 3,700,228 | A * | 10/1972 | Peale ................... | B23Q 1/5437 269/57 |
| 4,712,282 | A * | 12/1987 | Romeu .................. | B23Q 1/012 29/27 C |
| 8,172,234 | B2 * | 5/2012 | Bernhardt ............... | B23B 31/16 269/69 |
| 9,623,502 | B2 * | 4/2017 | Otani ........................ | B23F 1/06 |
| 9,782,847 | B2 * | 10/2017 | Otani ........................ | B23F 5/20 |

(Continued)

FOREIGN PATENT DOCUMENTS

JP 2010-167508 A 8/2010

*Primary Examiner* — Muhammad Ijaz
(74) *Attorney, Agent, or Firm* — Oblon, McClelland, Maier & Neustadt, L.L.P.

(57) ABSTRACT

A tilt device includes: a drive motor that provides a drive force for swinging a tilt member; an auxiliary cylinder coupled to the tilt member to assist swing of the tilt member by the drive motor; and a control device that performs drive control of the drive motor and the auxiliary cylinder. In the movable range of the tilt member, a moment about the swing axis generated in the tilt member by the gravitational force is always directed to only one side in the rotational direction, and an assistive moment about the swing axis provided to the tilt member by a cylinder pressure is always directed to only the other side in the rotational direction. The control device fluctuates the cylinder pressure such that the assistive moment is less than the moment generated in the tilt member by the gravitational force.

4 Claims, 7 Drawing Sheets

(56) References Cited

U.S. PATENT DOCUMENTS

| | | | |
|---|---|---|---|
| 2006/0185453 A1* | 8/2006 | Miyazawa | B23Q 1/52 |
| | | | 74/49 |
| 2010/0176545 A1* | 7/2010 | Yonenaga | B23Q 5/58 |
| | | | 269/289 R |
| 2011/0023654 A1* | 2/2011 | Tatsuda | B23Q 1/52 |
| | | | 74/813 R |
| 2012/0057944 A1* | 3/2012 | Nagata | B23F 5/163 |
| | | | 409/48 |
| 2017/0259387 A1* | 9/2017 | Furuhata | B23Q 1/5406 |

* cited by examiner

TILT DEVICE FOR MACHINE TOOL

INCORPORATION BY REFERENCE

The disclosure of Japanese Patent Application No. 2016-046157 filed on Mar. 9, 2016 including the specification, drawings and abstract, is incorporated herein by reference in its entirety.

BACKGROUND OF THE INVENTION

1. Field of the Invention

The present invention relates to a tilt device for a machine tool.

2. Description of the Related Art

A tilt device is known that includes a tilt member provided so as to be swingable and a drive motor that provides a drive force for swinging the tilt member. Such a tilt device is provided to a machine tool. The machine tool inclines a workpiece or a tool disposed on the tilt member to index the workpiece or the tool to perform predetermined machining.

When the tilt member is inclined with respect to a balanced position, the tilt member is subjected to a moment that urges the tilt member back to the balanced position using the gravitational force (hereinafter referred to as an "unbalance moment"). The unbalance moment generated in the tilt member becomes larger as the inclination angle of the tilt member becomes larger, and serves as a load applied to the drive motor which operates to maintain the tilt member in the inclined state. Thus, it is necessary to use a large drive motor in the case where the weight of the tilt member and the workpiece or the like to be disposed on the tilt member is heavy and it is attempted to support the load applied to the drive motor by the unbalance moment using only the drive torque from the drive motor.

Japanese Patent Application Publication No. 2010-167508 (JP 2010-167508 A) discloses a technique of alleviating a load applied to a drive motor by coupling a cylinder device to a tilt member and canceling out an unbalance moment using an urging force provided from the cylinder device to the tilt member.

In JP 2010-167508 A, when the inclination angle of the tilt member becomes less than a predetermined inclination angle, the moment provided from the cylinder device to the tilt member becomes more than the unbalance moment generated in the tilt member. That is, the direction of the load applied to the drive motor is inverted, and the direction of drive torque from the drive motor is also inverted, depending on whether the inclination angle of the tilt member is larger or smaller than the predetermined inclination angle. Thus, in the course of swinging the tilt member, a backlash may be caused in the tilt member because of the inversion of the drive torque from the drive motor when the inclination angle of the tilt member exceeds the predetermined inclination angle.

SUMMARY OF THE INVENTION

It is an object of the present invention to provide a tilt device for a machine tool capable of preventing a tilt member from being subjected to a backlash while suppressing an increase in size of a drive motor.

An aspect of the present invention provides a tilt device for a machine tool, including:

a tilt member on which a workpiece or a tool is disposed;

a support member that swingably supports the tilt member and that has a swing axis at a position that is different from a position of a center of gravity of the tilt member;

a drive motor that is provided to the support member and that provides a drive force for swinging the tilt member with respect to the support member;

an auxiliary cylinder that is coupled to the tilt member and that provides a cylinder pressure to assist swing of the tilt member by the drive motor; and a control device that performs drive control of the drive motor and the auxiliary cylinder.

A moment about the swing axis generated in the tilt member by a gravitational force is always directed to only one side in a rotational direction in a movable range of the tilt member. An assistive moment about the swing axis provided to the tilt member by the cylinder pressure is always directed to only the other side in the rotational direction in the movable range of the tilt member. The control device fluctuates the cylinder pressure such that the assistive moment is less than the moment generated in the tilt member by the gravitational force.

With the tilt device for a machine tool according to the aspect described above, swing of the tilt member by the drive motor is assisted by providing the tilt member with the cylinder pressure from the auxiliary cylinder, and thus the drive torque required for the drive motor can be reduced. Hence, an increase in size of the drive motor can be suppressed.

In the movable range of the tilt member, a moment about the swing axis generated in the tilt member by the gravitational force is always directed to only one side in the rotational direction, and an assistive moment provided to the tilt member by the cylinder pressure is always directed to only the other side in the rotational direction. In addition, the control device fluctuates the cylinder pressure such that the assistive moment is less than the moment generated in the tilt member by the gravitational force. In this case, in the movable range of the tilt member, a load based on the moment generated in the tilt member by the gravitational force is always applied to the drive motor, and the direction of drive torque from the drive motor is always constant. Thus, the inversion of the drive torque from the drive motor can be avoided in the course of swinging the tilt member, and thus occurrence of a backlash in the tilt member can be prevented.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A tilt device for a machine tool according to an embodiment of the present invention will be described below with reference to the drawings. In the embodiment, a tilt device 100 is used for a tooth forming device 1 which serves as a machine tool. The tilt device can also be used for a machine tool other than a machine tool that performs tooth formation, e.g. a machine tool that performs boring.

Figure 1:
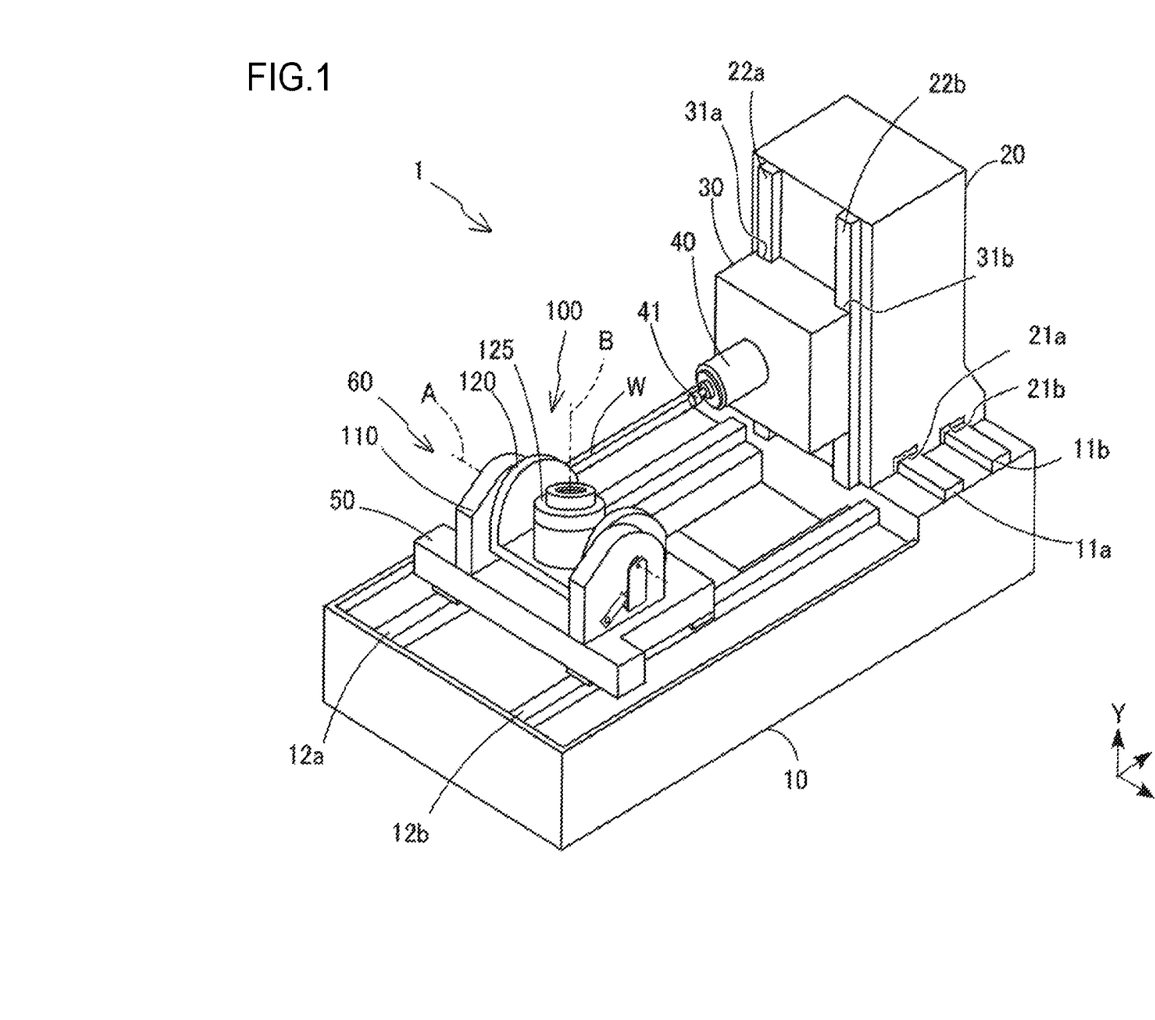
FIG. 1 is a perspective view illustrating the appearance of a tooth forming device that includes a tilt device according to an embodiment of the present invention.

First, an overview of the tooth forming device 1 will be described with reference to FIG. 1. As illustrated in FIG. 1, the tooth forming device 1 is a 5-axis machining center that includes three linear travel axes (X axis, Y axis, and Z axis) that are orthogonal to each other and two rotational axes (A axis and B axis) that are orthogonal to each other. The tooth forming device 1 mainly includes a bed 10, a column 20, a saddle 30, a rotary main spindle 40, a table 50, and the tilt device 100. In FIG. 1, the tilt device 100 is illustrated in a simplified form.

The bed 10 is fixed to an installation surface. A pair of X-axis guide rails 11a and 11b that extend in parallel in the X-axis direction and a pair of Z-axis guide rails 12a and 12b that extend in parallel in the Z-axis direction are formed on the upper surface of the bed 10.

The column 20 is relatively moved in the X-axis direction with respect to the bed 10. A pair of X-axis guide grooves 21a and 21b that extend in parallel in the X-axis direction are formed in the bottom surface of the column 20. A pair of Y-axis guide rails 22a and 22b that extend in parallel in the Y-axis direction are formed on one side surface of the column 20 that faces the table 50 and the tilt device 100. The pair of X-axis guide grooves 21a and 21b are fitted with the pair of X-axis guide rails 11a and 11b via ball guides (not illustrated). The bed 10 is provided with an X-axis ball screw (not illustrated) disposed between the pair of X-axis guide rails 11a and 11b, and an X-axis motor (not illustrated) that rotationally drives the X-axis ball screw. The column 20 is driven by the X-axis ball screw and the X-axis motor to be relatively moved in the X-axis direction with respect to the bed 10.

The saddle 30 is relatively moved in the Y-axis direction with respect to the column 20. A pair of Y-axis guide grooves 31a and 31b that extend in parallel in the Y-axis direction are formed in one side surface of the saddle 30 that faces the column 20. The pair of Y-axis guide grooves 31a and 31b are fitted with the pair of Y-axis guide rails 22a and 22b via ball guides (not illustrated). The column 20 is provided with a Y-axis ball screw (not illustrated) disposed between the pair of Y-axis guide rails 22a and 22b, and a Y-axis motor (not illustrated) that rotationally drives the Y-axis ball screw. The saddle 30 is driven by the Y-axis ball screw and the Y-axis motor to be relatively moved in the Y-axis direction with respect to the column 20.

The rotary main spindle 40 is provided so as to be rotatable by a main spindle motor (not illustrated) housed in the saddle 30. A machining tool 41 is fixed to the distal end of the rotary main spindle 40. The machining tool 41 is rotated about a center axis O along with rotation of the rotary main spindle 40. In FIG. 1, the machining tool 41 is illustrated in a simplified form. The machining tool 41 illustrated in FIG. 2 can be attached. The table 50 is disposed on the pair of Z-axis guide rails 12a and 12b, and provided so as to be movable in the Z-axis direction with respect to the bed 10.

The tilt device 100 is provided such that a tilt member 120 is swingable about an A axis with respect to a pair of support members 110 formed integrally with the table 50. The tilt member 120 is provided with a rotary table 125 that supports a workpiece W so as to be rotatable about a B axis. The rotary table 125 is rotationally driven by a turning shaft motor 126 (see FIG. 3) provided to the tilt member 120. The configuration of the tilt device 100 will be discussed in detail later.

Next, the operation of the machining tool 41 during cutting of the workpiece W will be described with reference to FIG. 2. A case where internal teeth are formed in the inner peripheral surface of the workpiece W which is formed in an annular shape will be described as an example.

Figure 2:
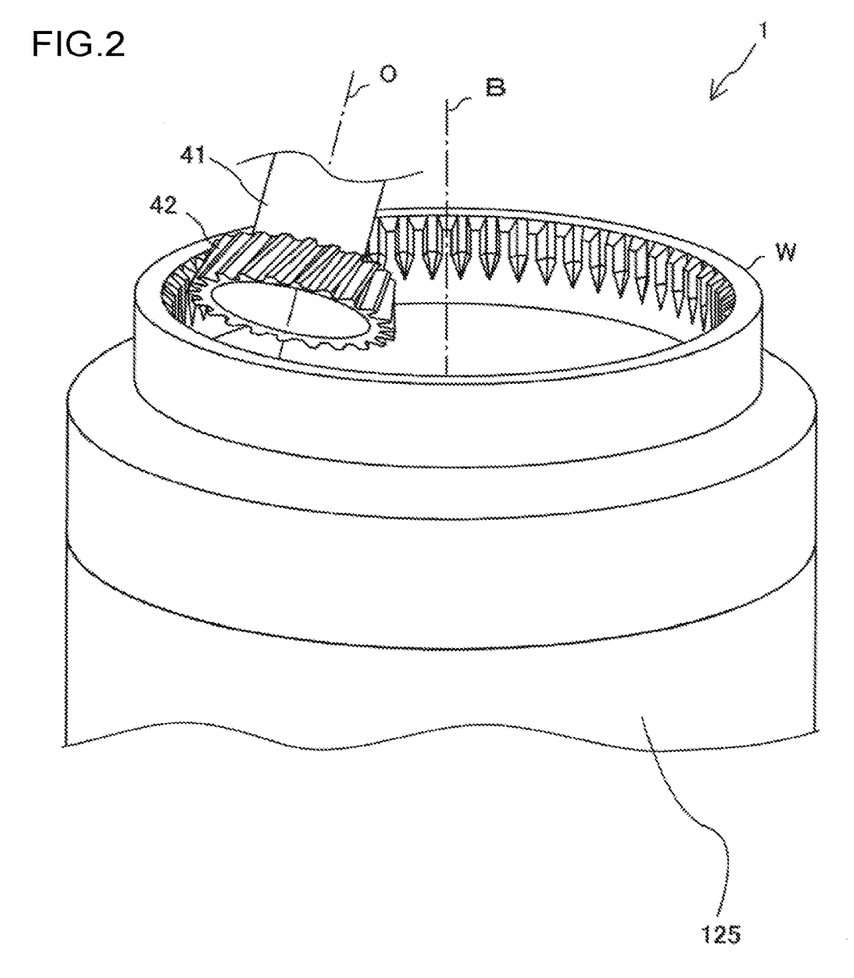
FIG. 2 illustrates the operation of a machining tool.

As illustrated in FIG. 2, the workpiece W is disposed on the rotary table 125 coaxially with the B axis, and supported by the rotary table 125 so as to be rotatable about the B axis. The machining tool 41 is disposed coaxially with the O axis, and supported by the rotary main spindle 40 (see FIG. 1) so as to be rotatable about the O axis. The machining tool 41 includes a plurality of tool blades 42 that have a helix angle with respect to the center axis of the machining tool 41. The radially outer surface of the tool blades 42 has a clearance angle with respect to the center axis of the machining tool. The end surface of the tool blades 42 has a rake angle with respect to a plane that is orthogonal to the center axis of the machining tool 41.

When the tooth forming device 1 performs tooth formation, the tilt member 120 (see FIG. 1) is swung such that the center axis (B axis) of the workpiece W is inclined and skewed with respect to the center axis (O axis) of the machining tool 41. After that, the machining tool 41 is relatively moved in the B-axis direction while rotating the machining tool 41 and the workpiece W in synchronization with each other with the inclination angle of the tilt member 120 maintained. In this event, a relative speed difference is caused between the workpiece W and the machining tool 41, and the inner peripheral surface of the workpiece W is cut at the location of contact with the tool blades 42 so that internal teeth are formed in the workpiece W.

Figure 3:
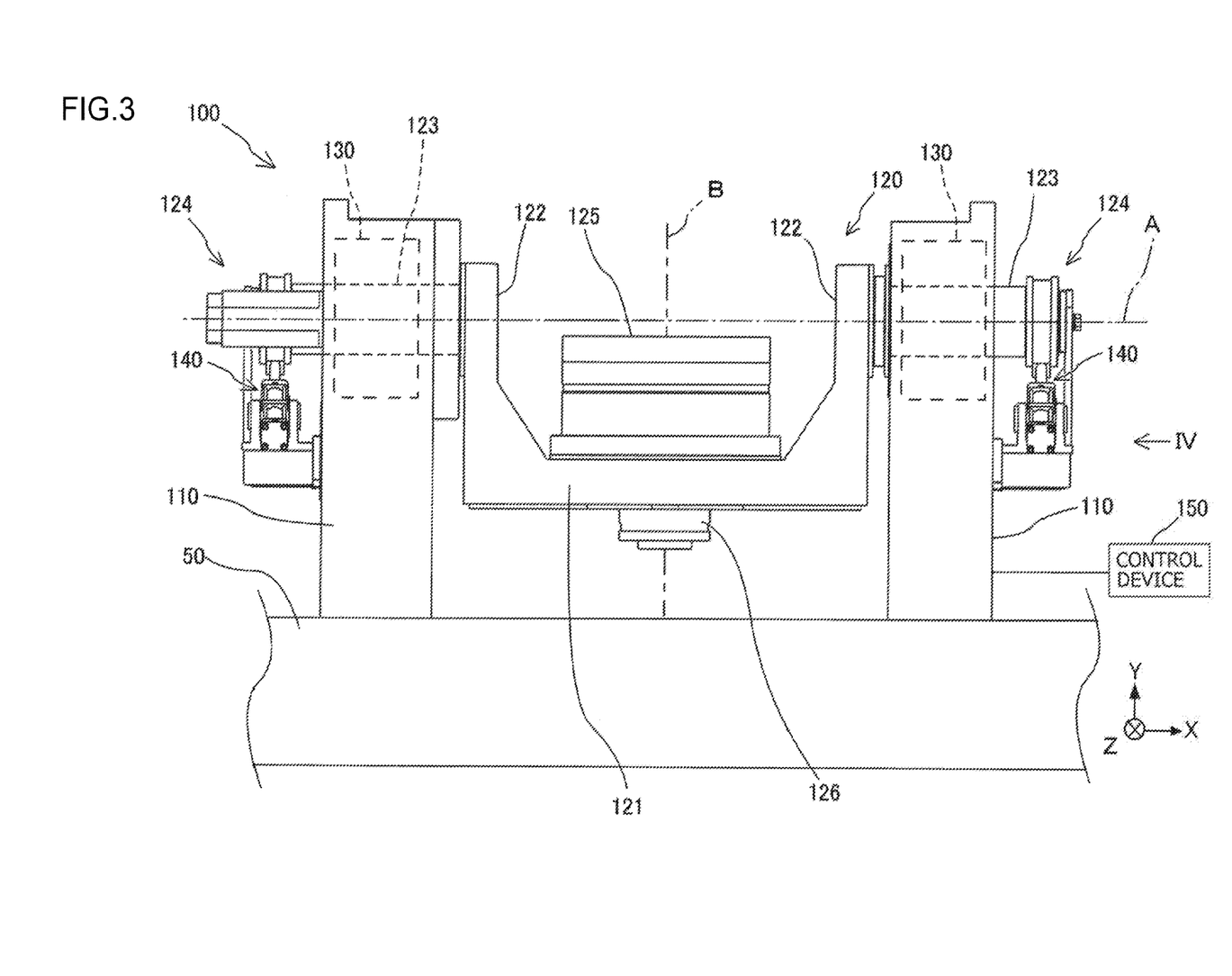
FIG. 3 is a front view of the tilt device.
Figure 4:
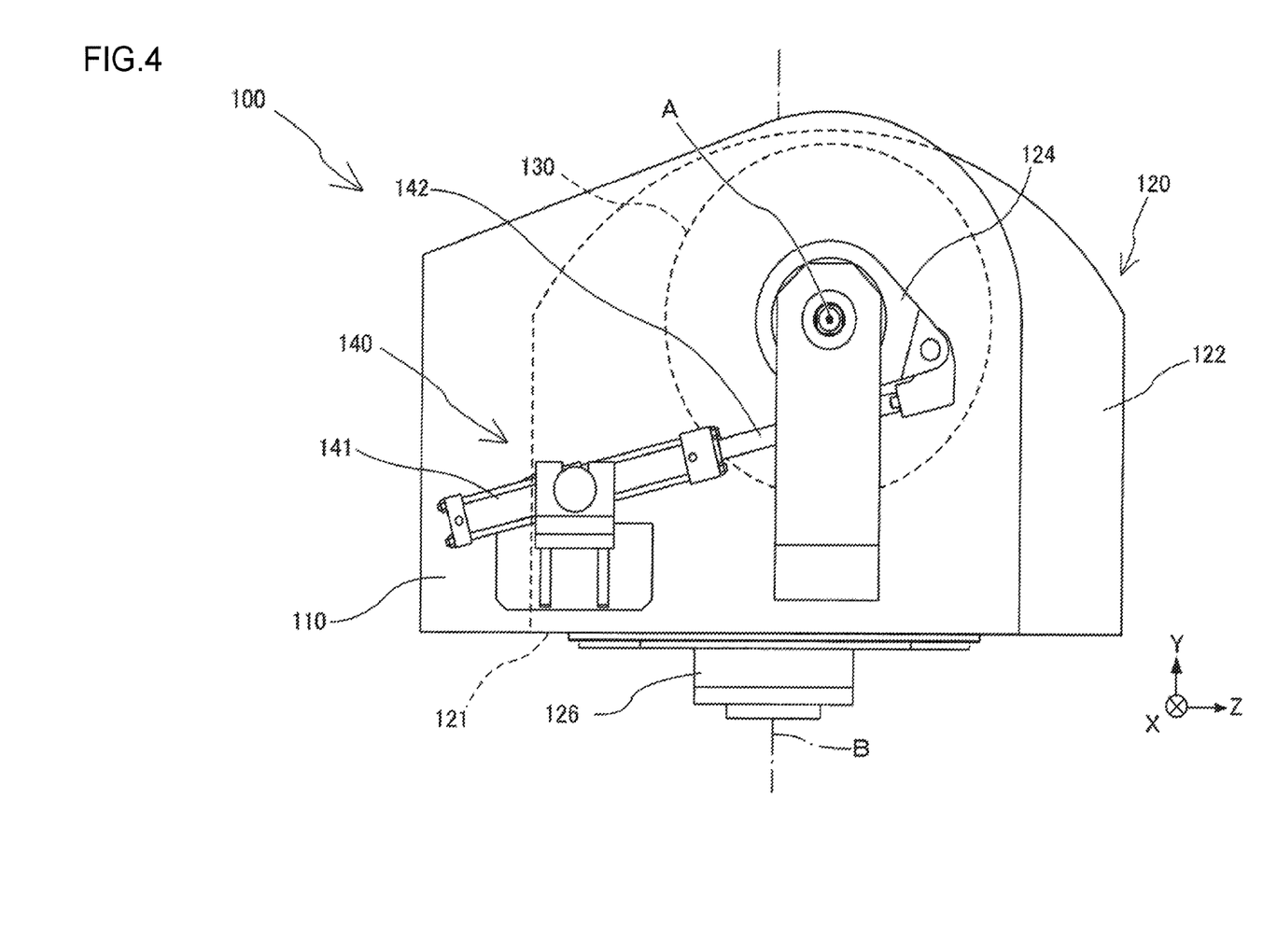
FIG. 4 is a side view of the tilt device as seen in the direction IV of FIG. 3.

The configuration of the tilt device 100 will be described with reference to FIGS. 3 and 4. As illustrated in FIGS. 3 and 4, the tilt device 100 mainly includes the pair of support members 110, the tilt member 120, drive motors 130, auxiliary cylinders 140, and a control device 150. The support members 110 are plate-like members integrally fixed to the upper surface of the table 50. The pair of support members 110 are disposed so as to face each other with a space therebetween in the X-axis direction. The tilt member 120 is disposed between the pair of support members 110.

The tilt member 120 includes a tilt plate 121, a pair of upright portions 122, and a pair of shaft portions 123. The tilt plate 121 is formed in the shape of a rectangular plate, the longitudinal direction of which corresponds to the X-axis direction. The pair of upright portions 122 are plate-like portions provided at both end portions of the tilt plate 121 in the longitudinal direction so as to extend upright, and are disposed so as to face each other with a space therebetween in the X-axis direction.

The shaft portions 123 are circular column portions that extend in the X-axis direction. The shaft portions 123 are disposed coaxially with each other on surfaces of the pair of upright portions 122 directed outward, and swingably supported by the pair of support members 110. The shaft portions 123 are provided to penetrate the pair of support members 110. Overhanging portions 124 that overhang radially outward are fixed to distal end portions of the shaft portions 123 that project from surfaces of the pair of support members 110 directed outward. The A axis which is the center axis of the shaft portions 123 is disposed in a plane that includes the center of the tilt plate 121 in the width direction (right-left direction in FIG. 4) and that is perpendicular to the upper surface of the tilt plate 121.

The tilt member 120 includes the rotary table 125 and the turning shaft motor 126. The rotary table 125 is a member that supports the workpiece W so as to be rotatable about the B axis, and is disposed on the upper surface of the tilt plate 121 which is orthogonal to the B axis. The turning shaft motor 126 is a motor that provides a drive force for rotating the rotary table 125.

The rotary table 125 and the turning shaft motor 126 are disposed with the center of gravity of the rotary table 125 and the turning shaft motor 126 offset in the direction (leftward in FIG. 4) away from the saddle 30 (see FIG. 1) with respect to the center of the tilt plate 121 in the width direction (right-left direction in FIG. 4). That is, the center of gravity of the tilt member 120 which includes the rotary table 125 and the turning shaft motor 126 is offset in the direction away from the saddle 30, in the width direction of the tilt plate 121, with respect to the A axis which is the center axis of the shaft portions 123 and the swing axis of the tilt member 120.

The drive motors 130 are each a motor that provides a drive force for rotating the tilt member 120, and are housed inside the support members 110. The tilt member 120 is swung about the A axis, which is the center axis of the shaft portions 123, when a drive force is provided from the drive motors 130 to the shaft portions 123.

The auxiliary cylinders 140 are each a hydraulic cylinder that assists the swing of the tilt member 120 by the drive motors 130. The auxiliary cylinders 140 each include a cylinder body 141 swingably supported by the support member 110 via a bracket, and a rod 142 provided so as to be expandable and contractible with respect to the cylinder body 141. The overhanging portion 124 which overhangs radially outward is formed on the shaft portion 123, and the distal end of the rod 142 is coupled to the overhanging portion 124 at a position offset from the A axis. That is, the auxiliary cylinder 140 and the tilt member 120 are coupled to each other at a position that is different from that of the A axis which is the swing axis of the tilt member 120.

To swing the tilt member 120, the control device 150 performs drive control of the drive motor 130 and the auxiliary cylinder 140. To rotate the rotary table 125, the control device 150 performs drive control of the turning shaft motor 126.

When the tilt member 120 at the balanced position is swung, the tilt member 120 is subjected to an unbalance moment that urges the tilt member 120 back to the balanced position using the gravitational force. The unbalance moment becomes larger as the inclination angle of the tilt member 120 becomes larger, and accordingly a larger load is applied to the drive motor 130 which operates to maintain the tilt member 120 in the inclined state. Thus, the size of the drive motor 130 is increased in the case where the weight of the tilt member 120 and the workpiece W (see FIG. 1) to be disposed on the tilt member 120 is heavy and it is attempted to support the load applied to the drive motor 130 by the unbalance moment using only the drive torque from the drive motor 130.

In the tilt device 100, a cylinder pressure from the auxiliary cylinder 140 is provided to the shaft portion 123 to generate a moment in the direction opposite to that of the unbalance moment generated in the tilt member 120. Consequently, a part of the unbalance moment is canceled out by the moment (hereinafter referred to as "assistive moment") provided to the tilt member 120 by the cylinder pressure, and thus the load applied to the drive motor 130 by the unbalance moment can be alleviated. As a result, drive torque required for the drive motor 130 can be reduced, and thus an increase in size of the drive motor 130 can be suppressed. Depending on the machining method, the center of gravity of the rotary table 125 and the turning shaft motor 126 may be offset in the direction closer to the saddle 30 in order to change the balanced position.

As described above, the center of gravity of the tilt member 120 is offset in the direction away from the saddle 30 with respect to the A axis in the width direction of the tilt plate 121. Thus, when the tilt member 120 is in the balanced state, the upper surface of the tilt plate 121 is inclined downward in the direction away from the saddle 30 (see FIG. 5A).

In the following description, the inclination angle of the tilt member 120 (see FIG. 5B) with the tilt plate 121 in parallel with the Z-axis direction is defined as 0 degrees. The inclination angle of the tilt member 120 inclined clockwise in FIG. 5B from an inclination angle of 0 degrees is indicated as a positive value. The inclination angle of the tilt member 120 inclined counterclockwise in FIG. 5B from an inclination angle of 0 degrees is indicated as a negative value.

Figure 5A:
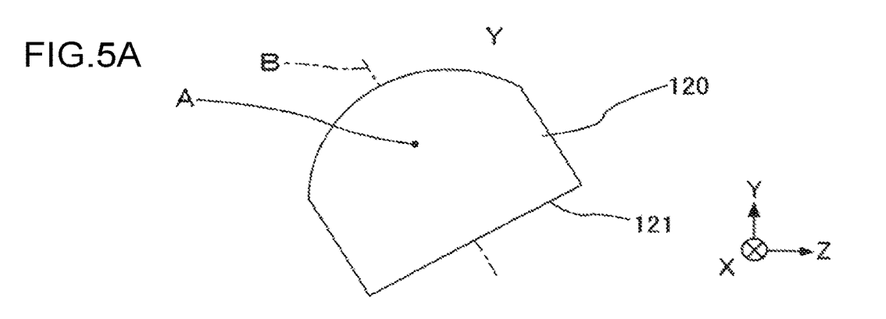
FIG. 5A schematically illustrates a tilt member at a balanced position, illustrating the tilt member at an inclination angle of −30 degrees.
Figure 5B:
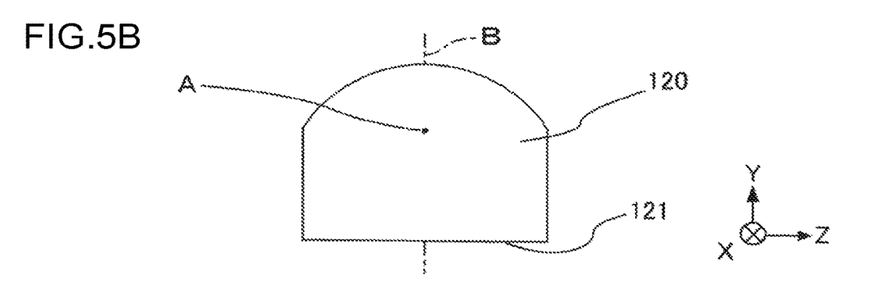
FIG. 5B schematically illustrates the tilt member, illustrating the tilt member at an inclination angle of 0 degrees.

FIG. 5A illustrates the tilt member 120 at the balanced position. The inclination angle of the tilt member 120 at the balanced position is −30 degrees. The tilt device 100 can swing the tilt member 120 through drive control of the drive motor 130 and the auxiliary cylinder 140 by the control device 150 such that the inclination angle of the tilt member 120 is in the range of −5 degrees to 95 degrees. Consequently, the direction of the unbalance moment generated in the tilt member 120 is always constant in the movable range of the tilt member 120. The shaft portion 123 is provided with a rotary encoder (not illustrated), and the control device 150 grasps the inclination angle of the tilt member 120 on the basis of detected information obtained from the rotary encoder.

In the relationship between the tilt member 120 and the auxiliary cylinder 140, the shaft portion 123 is provided with the overhanging portion 124, and the distal end of the rod 142 is coupled to the overhanging portion 124. Thus, as the tilt member 120 is swung, the position of coupling between the rod 142 and the overhanging portion 124 is rotationally moved about the A axis, and the direction of expansion and contraction of the rod 142 is varied with respect to the direction between the position of coupling between the rod 142 and the overhanging portion 124 and the A axis (overhanging direction of the overhanging portion 124). In this case, if the cylinder pressure from the auxiliary cylinder 140 is constant, the assistive moment provided to the tilt member 120 is varied in accordance with the inclination angle of the tilt member 120.

In this respect, the tilt device 100 sets the arrangement of the auxiliary cylinder 140 and the position of coupling between the overhanging portion 124 and the rod 142 such that the direction of the assistive moment provided to the tilt member 120 by the cylinder pressure is always constant and opposite to the direction of the unbalance moment in the movable range of the tilt member 120. Consequently, the unbalance moment generated in the tilt member 120 can be canceled out by the assistive moment in the movable range of the tilt member 120.

In the tilt device 100, the position of coupling between the rod 142 and the overhanging portion 124 is set such that the assistive moment becomes larger as the unbalance moment becomes larger in the movable range of the tilt member 120. Hence, the difference between the unbalance moment and the assistive moment can be reduced.

Next, drive control of the auxiliary cylinder 140 by the control device 150 will be described with reference to FIGS. 6A and 6B. The control device 150 sets the cylinder pressure output from the auxiliary cylinder 140 to either high pressure (e.g. 6 MPa) or low pressure (e.g. 3 MPa), and adjusts the magnitude of the assistive moment provided to the tilt member 120 by the cylinder pressure.

Figure 6A:
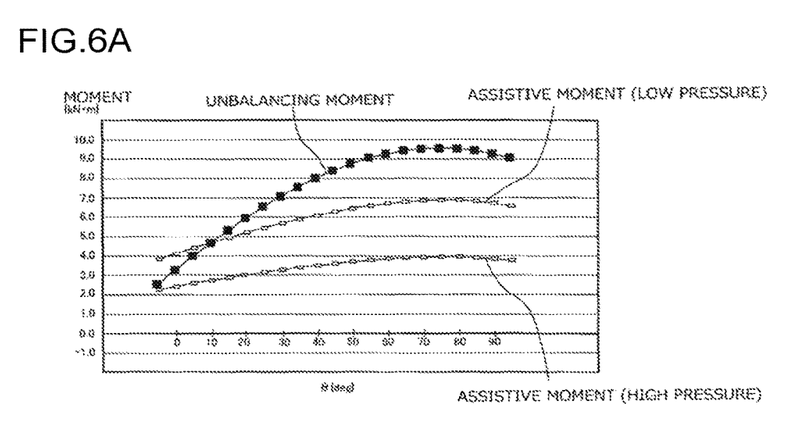
FIG. 6A is a graph illustrating the relationship among the cylinder pressure, an unbalance moment and an assistive moment, and drive torque.

As illustrated in FIG. 6A, in the case where the cylinder pressure is set to the high pressure, the assistive moment provided to the tilt member 120 is large compared to a case where the cylinder pressure is set to the low pressure. Thus, in a state in which the inclination angle of the tilt member 120 is large and the unbalance moment generated in the tilt member 120 is large, it is desirable to set the cylinder pressure from the auxiliary cylinder 140 to be high such that the assistive moment provided to the tilt member 120 is large.

In the case where the cylinder pressure from the auxiliary cylinders 140 is set to be high at all times irrespective of the inclination angle of the tilt member 120, the assistive moment becomes more than the unbalance moment when the inclination angle of the tilt member 120 becomes equal to or less than about 10 degrees. In this case, the direction of the load applied to the drive motor 130 is inverted, and the direction of the drive torque from the drive motor 130 is also inverted, depending on whether the inclination angle of the tilt member 120 is large or small. Therefore, the magnitude relationship between the unbalance moment and the assistive moment is inverted in the course of swinging the tilt member 120, and accordingly the tilt member 120 may be subjected to a backlash caused by the inversion of the drive torque from the drive motor.

On the other hand, in the case where the cylinder pressure is set to a low pressure, the assistive moment provided to the tilt member 120 is always less than the unbalance moment in the movable range of the tilt member 120, and therefore inversion of drive torque from the drive motor 130 can be avoided. However, if the cylinder pressure is set to be low at all times irrespective of the inclination angle of the tilt member 120, the difference between the unbalance moment and the assistive moment is increased in the case where the inclination angle of the tilt member 120 is increased. As a result, drive torque required for the drive motor 130 is increased, and the size of the drive motor 130 is increased.

Figure 5C:
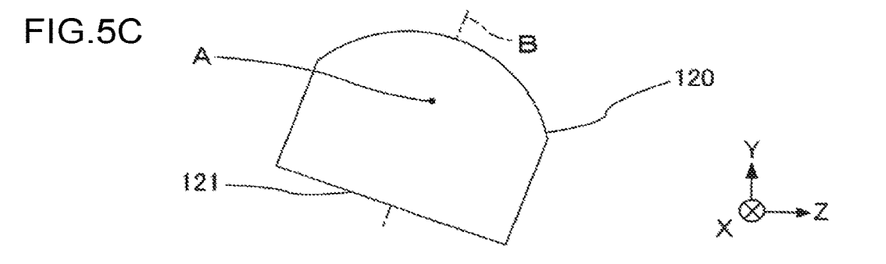
FIG. 5C schematically illustrates the operation of the tilt member, illustrating the tilt member at an inclination angle of 20 degrees.
Figure 6B:
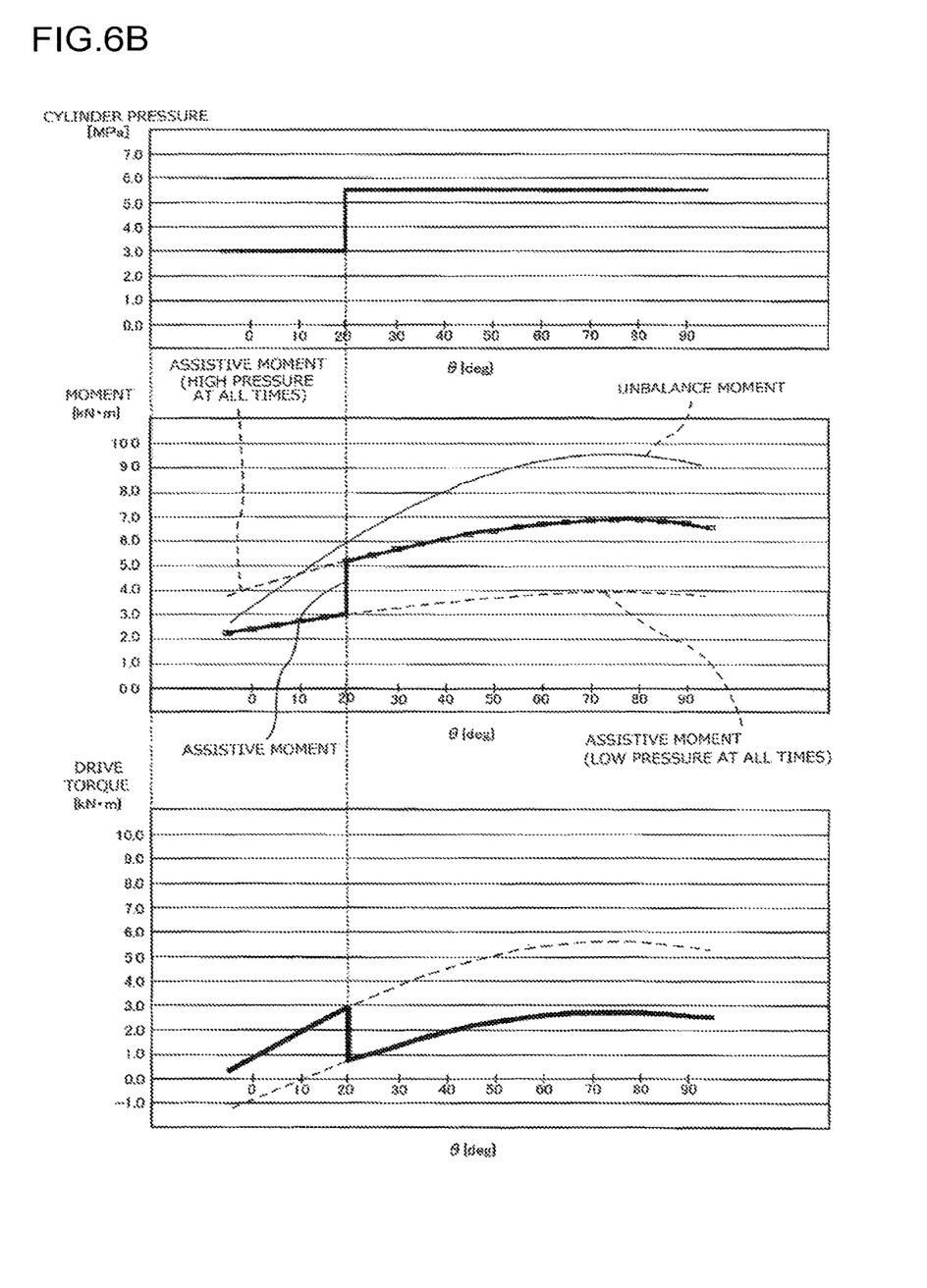
FIG. 6B is a graph illustrating the relationship between the inclination angle of the tilt member and the cylinder pressure from the auxiliary cylinder and drive torque from a drive motor.

In contrast, as illustrated in FIG. 6B, the control device 150 fluctuates the cylinder pressure in the case where the inclination angle of the tilt member 120 reaches 20 degrees (see FIG. 5C). That is, the control device 150 switches the cylinder pressure from the low pressure to the high pressure in the case where the inclination angle of the tilt member 120 becomes equal to or more than 20 degrees with the cylinder pressure set to the low pressure. Similarly, the control device 150 switches the cylinder pressure from the high pressure to the low pressure in the case where the inclination angle of the tilt member 120 becomes equal to or less than 20 degrees with the cylinder pressure set to the high pressure.

In this case, in a state in which the inclination angle of the tilt member 120 is more than 20 degrees, the assistive moment provided to the tilt member 120 can be increased, and thus the difference between the unbalance moment and the assistive moment can be reduced. Consequently, even in a state in which the inclination angle of the tilt member 120 is large, the load applied to the drive motor 130 by the unbalance moment can be alleviated, and thus drive torque required for the drive motors 130 can be reduced. Thus, an increase in the size of the drive motor 130 can be suppressed.

On the other hand, in a state in which the inclination angle of the tilt member 120 is less than 20 degrees, the assistive moment provided to the tilt member 120 can be reduced, and thus inversion of the magnitude relationship between the assistive moment and the unbalance moment can be avoided.

In this way, the control device 150 fluctuates the cylinder pressure from the auxiliary cylinder 140 such that the assistive moment is always less than the unbalance moment in the movable range of the tilt member 120. Consequently, a load in only one direction due to the unbalance moment is always applied to the drive motor 130 in the movable range of the tilt member 120, and thus the direction of the drive torque from the drive motor is always constant. As a result, inversion of drive torque from the drive motor 130 can be avoided in the course of swinging the tilt member 120, and thus the tilt member 120 can be prevented from being subjected to a backlash.

The control device 150 fluctuates the cylinder pressure on the basis of the inclination angle of the tilt member 120, and fluctuates the cylinder pressure from the low pressure to the high pressure, or from the high pressure to the low pressure, in the case where the inclination angle of the tilt member 120 reaches a prescribed inclination angle (in the embodiment, 20 degrees) determined in advance. Hence, the drive control of the auxiliary cylinder 140 can be simplified compared to a case where the cylinder pressure is fluctuated continuously in accordance with the inclination angle of the tilt member 120.

Figure 5D:
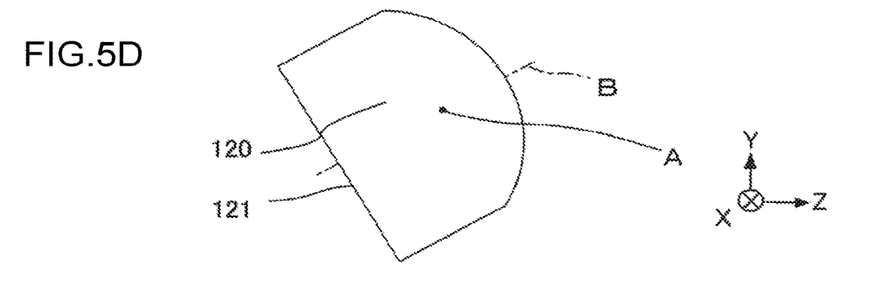
FIG. 5D schematically illustrates the operation of the tilt member, illustrating the tilt member at an inclination angle of 60 degrees.

The tooth forming device 1 (see FIG. 1) performs tooth formation on the workpiece W (see FIG. 1) with the inclination angle of the tilt member 120 maintained at 60 degrees (see FIG. 5D). That is, the tooth formation is performed with the inclination angle of the tilt member 120 exceeding 20 degrees, while the control device 150 fluctuates the cylinder pressure from the auxiliary cylinder 140 when the inclination angle of the tilt member 120 reaches 20 degrees. In this case, fluctuations in cylinder pressure during tooth formation can be avoided, and thus a reduction in machining accuracy during tooth formation can be prevented.

The control device 150 performs drive control of the turning shaft motor 126 when the inclination angle of the tilt member 120 is in the range of more than 20 degrees. That is, the control device 150 is set such that drive control of the cylinder pressure and drive control of the turning shaft motor 126 are not performed at the same time. Consequently, the swing of the tilt member 120 and the rotation of the workpiece W which is performed during tooth formation are not performed at the same time, and thus fluctuations in cylinder pressure during tooth formation can be prevented in advance.

Although the present invention has been described above on the basis of the embodiment described above, the present invention is not limited to the embodiment described above in any way. It is easily inferred that a variety of modifications and alterations can be made without departing from the scope and spirit of the present invention. The numerical values used in the embodiment described above are exemplary, and it is a matter of course that other numerical values can also be adopted.

For example, in the embodiment described above, the cylinder pressure is fluctuated when the inclination angle of the tilt member 120 reaches 20 degrees. However, the present invention is not limited thereto. That is, it is only necessary that the cylinder pressure should be fluctuated such that the assistive moment is always less than the unbalance moment in the movable range of the tilt member 120. As long as such a condition is met, the inclination angle of the tilt member 20 at the time when the cylinder pressure is fluctuated may be set as desired. In addition, in the embodiment described above, the cylinder pressure is output from the auxiliary cylinder 140 in two patterns (low pressure and high pressure). However, the cylinder pressure may be output in three or more patterns.

In the embodiment described above, the tooth formation is performed in the case where the inclination angle of the tilt member 120 reaches 60 degrees. However, the present invention is not limited thereto. That is, it is only necessary that the inclination angle of the tilt member 120 at the time when the tooth formation is performed should be in the range of more than the inclination angle of the tilt member 120 at the time when the cylinder pressure is fluctuated. As long as such a condition is met, the inclination angle of the tilt member 120 at the time when the tooth formation is performed may be set as desired.

In the embodiment described above, the tilt member 120 is in the balanced state in the case where the inclination angle of the tilt member 120 is −30 degrees. However, it is only necessary that the inclination angle of the tilt member 120 at the balanced position should be set to an inclination angle that is less than the lower limit (in the embodiment described above, −5 degrees) of the movable range of the tilt member 120. As long as such a condition is met, the inclination angle of the tilt member 120 at the balanced position may be set as desired. In addition, it is only necessary that the movable range of the tilt member 120 should be set within the range of more than the inclination angle of the tilt member 120 at the balanced position. As long as such a condition is met, the movable range of the tilt member 120 may be set as desired.

In the embodiment described above, the cylinder pressure is fluctuated in the case where the inclination angle of the tilt member 120 reaches a prescribed inclination angle (in the embodiment described above, 20 degrees) determined in advance. However, the present invention is not limited thereto. The cylinder pressure may be fluctuated continuously in accordance with the fluctuations in the inclination angle of the tilt member 120. In this case, the inversion of the magnitude relationship between the assistive moment and the unbalance moment can be avoided in the course of swinging the tilt member 120, and thus the tilt member 120 can be prevented from being subjected to a backlash caused by the inversion of the drive torque from the drive motor 130. The assistive moment can be brought closer to the unbalance moment, and thus a load applied to the drive motor 130 by the unbalance moment can be alleviated. Hence, drive torque required for the drive motor 130 can be reduced, and thus an increase in size of the drive motor 130 can be suppressed. It is only necessary that the drive motor 130 should be provided in one of the support members 110.

In the embodiment described above, the center of gravity of the rotary table 125 and the turning shaft motor 126 is offset from the A axis in the width direction of the tilt plate 121 so that the center of gravity of the tilt member 120 which includes the rotary table 125 and the turning shaft motor 126 is provided at a position that is different from that of the A axis which is the swing axis of the tilt member 120. However, the center of gravity of the tilt member 120 may be offset from the A axis by changing the shape of the tilt member 120 or the arrangement of the shaft portion 123.

As has been described above, the tilt device 100 according to the present invention is provided to the tooth forming device 1 which serves as a machine tool. The tilt device 100 includes: the tilt member 120 on which a workpiece W or a tool is disposed; the support member 110 that swingably supports the tilt member 120 and that has the A axis which serves as a swing axis at a position that is different from a position of a center of gravity of the tilt member 120; the drive motor 130 that is provided to the support member 110 and that provides a drive force for swinging the tilt member 120 with respect to the support member 110; the auxiliary cylinder 140 that is coupled to the tilt member 120 and that provides a cylinder pressure to assist the swing of the tilt member 120 by the drive motor 130; and the control device 150 that performs the drive control of the drive motor 130 and the auxiliary cylinder 140.

In the tilt device 100, an unbalance moment which is a moment about the swing axis generated in the tilt member 120 by a gravitational force is always directed to only one side in a rotational direction in a movable range of the tilt member 120, and an assistive moment about the swing axis provided to the tilt member 120 by the cylinder pressure is always directed to only the other side in the rotational direction in the movable range of the tilt member 120. In the tilt device 100, the control device 150 fluctuates the cylinder pressure such that the assistive moment is less than the moment generated in the tilt member 120 by the gravitational force.

With the tilt device 100, swing of the tilt member 120 by the drive motor 130 is assisted by providing the tilt member 120 with the cylinder pressure from the auxiliary cylinder 140, and thus drive torque required for the drive motor 130 can be reduced. Hence, an increase in size of the drive motor 130 can be suppressed even in the case where the size of the workpiece W is large or in the case where the weight of the workpiece W is heavy.

In the movable range of the tilt member 120, an unbalance moment which is a moment about the swing axis generated in the tilt member 120 by the gravitational force is always directed to only one side in the rotational direction, and an assistive moment provided to the tilt member 120 by the cylinder pressure is always directed to only the other side in the rotational direction. In addition, the control device 150 fluctuates the cylinder pressure such that the assistive moment is less than the moment generated in the tilt member 120 by the gravitational force. In this case, in the movable range of the tilt member 120, a load based on the moment generated in the tilt member 120 by the gravitational force is always applied to the drive motor 130, and the direction of the drive torque from the drive motor 130 is always constant. Thus, inversion of drive torque from the drive motor 130 can be avoided in the course of swinging the tilt member 120, and thus the tilt member 120 can be prevented from being subjected to a backlash.

In the tilt device 100 described above, the control device 150 fluctuates the cylinder pressure in accordance with an inclination angle of the tilt member 120. With the tilt device 100, the drive control of the auxiliary cylinder 140 by the control device 150 can be simplified.

In the tilt device 100 described above, the control device 150 fluctuates the cylinder pressure in the case where the inclination angle of the tilt member 120 reaches a prescribed inclination angle determined in advance. With the tilt device 100, the drive control of the auxiliary cylinder 140 by the control device 150 can be simplified.

In the tilt device 100 described above, the tooth forming device 1 which serves as the machine tool machines the workpiece W only in a range in which the inclination angle of the tilt member 120 exceeds the prescribed inclination angle. With the tilt device 100, fluctuations in cylinder pressure during tooth formation can be avoided, and thus a reduction in machining accuracy during tooth formation can be prevented.

In the tilt device 100 described above, the tilt member 120 includes the rotary table 125 that rotates the workpiece W about the B axis which is an axis that is orthogonal to the swing axis of the tilt member 120, and the control device 150 performs drive control of the rotary table 125 only in the range in which the inclination angle of the tilt member 120 exceeds the prescribed inclination angle. With the tilt device 100, the swing of the tilt member 120 and the rotation of the workpiece W which is performed during tooth formation are not performed at the same time. Hence, fluctuations in cylinder pressure during tooth formation can be prevented in advance.

In the tilt device 100 described above, the control device 150 continuously fluctuates the cylinder pressure in accordance with the inclination angle of the tilt member 120. With the tilt device 100, inversion of the magnitude relationship between the assistive moment and the unbalance moment can be avoided in the course of swinging the tilt member 120. Hence, the tilt member 120 can be prevented from being subjected to a backlash caused by the inversion of the drive torque from the drive motor 130. The assistive moment can be brought closer to the unbalance moment, and thus a load applied to the drive motor 130 by the unbalance moment can be alleviated. As a result, the drive torque required for the drive motor 130 can be reduced, and thus an increase in size of the drive motor 130 can be suppressed.

What is claimed is:

1. A tilt device for a machine tool, comprising:
a tilt member on which a workpiece or a tool is disposed;
a support member that swingably supports the tilt member and that has a swing axis at a position that is different from a position of a center of gravity of the tilt member;
a drive motor that is provided to the support member and that provides a drive force for swinging the tilt member with respect to the support member;
an auxiliary cylinder that is coupled to the tilt member and that provides a cylinder pressure to assist swing of the tilt member by the drive motor; and
a control device that performs drive control of the drive motor and the auxiliary cylinder, wherein
the center of gravity of the tilt member is offset to one side relative to the swing axis from a vertical position by an inclination angle to balance the tilt member at a balanced position,
a moment about the swing axis generated in the tilt member by a gravitational force at the center of gravity of the tilt member is always directed to only the one side in a rotational direction in a movable range of the tilt member, the moment urging the tilt member back to the balanced position using the gravitational force,
an assistive moment about the swing axis provided to the tilt member by the cylinder pressure is always directed to only the other side in the rotational direction in the movable range of the tilt member,
the control device fluctuates the cylinder pressure based on the inclination angle of the tilt member such that the assistive moment is less than the moment generated in the tilt member by the gravitational force, the cylinder pressure being higher when the inclination angle of the tilt member is greater than a predetermined inclination angle than when the inclination angle of the tilt member is less than the predetermined inclination angle, and
the cylinder pressure is equal to a first value when the inclination angle of the tilt member is greater than the predetermined inclination angle, and the cylinder pressure is equal to a second value when the inclination angle of the tilt member is less than the predetermined inclination angle, the first value being greater than the second value.

2. The tilt device for a machine tool according to claim 1, wherein
the tilt member includes a rotary table that rotates the workpiece about an axis that is orthogonal to the swing axis of the tilt member, and
the control device performs drive control of the rotary table only in the range in which the inclination angle of the tilt member exceeds the predetermined inclination angle.

3. The tilt device for a machine tool according to claim 1, wherein the inclination angle at the balanced position is −30° and at the vertical position is 0°.

4. The tilt device for a machine tool according to claim 1, wherein the predetermined inclination angle is equal to 20°.

* * * * *